Jan. 13, 1959    C. M. NEHER ET AL    2,868,853
ACID SCRUBBER
Filed Oct. 25, 1956
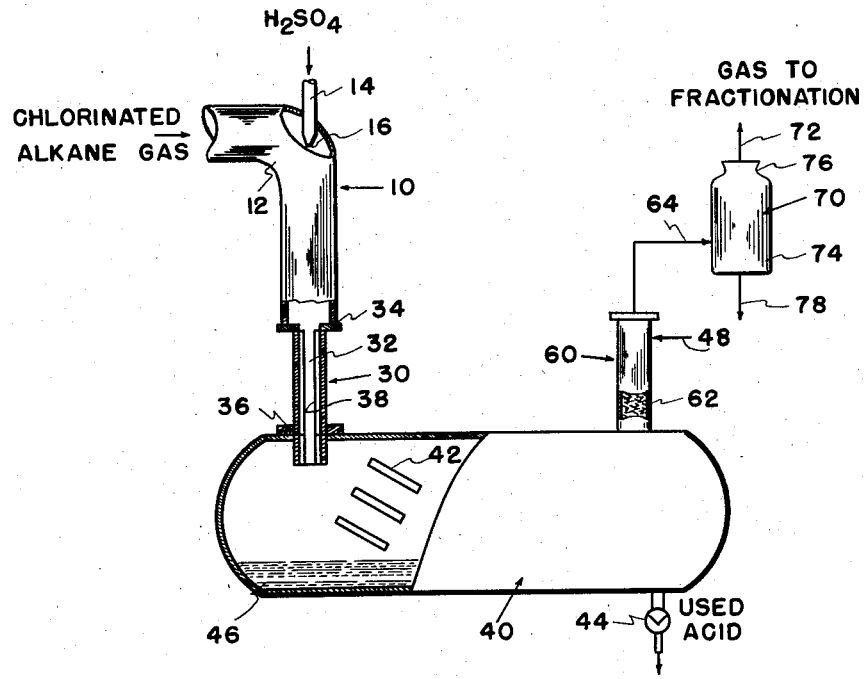

United States Patent Office 2,868,853
Patented Jan. 13, 1959

2,868,853

ACID SCRUBBER

Clarence M. Neher and Harry E. O'Connell, Baton Rouge, La., assignors to Ethyl Corporation, New York, N. Y., a corporation of Delaware Application October 25, 1956, Serial No. 618,220

3 Claims. (Cl. 260—660)

This invention relates to the treatment of chlorinated hydrocarbons and more particularly but not exclusively to the removal of finely divided carbon and/or water from chlorinated alkanes.

Several chlorinated alkanes are produced commercially, such as methyl chloride, methylene chloride, carbon tetrachloride, and ethyl chloride. These products have a large number of uses. The chlorine derivatives of methane are used as industrial solvents. The principal use of ethyl chloride is as an intermediate in the manufacture of tetraethyllead. All of the chlorinated alkanes can be produced by thermal chlorination of the corresponding alkanes, generally at temperatures above about 250°–300° C. and frequently up to about 600° C. Under these conditions some of the hydrocarbon is decomposed to carbon which is entrained as a fines in the gaseous reaction product. This carbon tends to plug the product recovery equipment and, thus, requires frequent plant shutdowns and appreciable plant maintenance.

Another serious problem arises from the presence of water in the reaction product. The water may enter the system associated with the feed materials, either the chlorine or the alkane, or may be formed from oxygen in the chlorination reactor. Very minor quantities of water in the chlorinated alkane e. g., as low as 10 p. p. m., increase many fold the corrosiveness of such gaseous streams. Such minute concentrations cannot be suitably removed by known processes, e. g. sulfuric acid drying towers and the like. In consequence, expensive alloys must be used in most if not all the recovery equipment, such as distillation columns, stills, pipings, and tanks. Any means which will alleviate or eliminate these problems are of the utmost commercial significance.

It is accordingly an object of this invention to provide a process for removing finely divided carbon from gaseous chlorinated alkanes. An additional object is to provide such a process for reducing the water content of chloro alkanes to essentially non-corrosive concentrations. A more specific object is to provide an improved means for removing carbon and water from chlorinated ethane reaction products in which the principal product is ethyl chloride. Another object is to provide a process which is adaptable for commercial use, i. e., capable of economical and troublefree use in large volume production of chlorinated alkanes. Other objects and advantages of the invention will be apparent from the following description and appended claims.

It has now been found that finely divided carbon and water can be eliminated from chlorinated hydrocarbon gases, or materially reduced below noxious levels e. g. below about 0.004 mole percent, if the gaseous chlorinated hydrocarbon is intimately contacted with liquid concentrated sulfuric acid by simultaneously passing a mixture of the chlorinated hydrocarbon gas and liquid sulfuric acid from a first flow zone to a second contacting zone having a restricted cross sectional area whereby the fluid is subjected to a substantial pressure reduction. The purified gas can thereafter be separated from the liquid by phase separation.

More particularly, the preferred process comprises passing the fluid mixture through a contacting zone in which the fluid flow path is essentially instantly reduced, i. e. the flow path is reduced in cross sectional area by at least 3 square units of area per unit of linear flow, and preferably at a rate of at least 8 square units of area per unit of linear flow. At the same time, the velocity of fluid flow through the contacting zone should be at least 20 feet per second, and preferably is greater than 90 feet per second. In a simple and convenient embodiment of the invention, the liquid-gas mixture is passed through a zone comprising pipe sections of different diameters, joined without any material bevel so as to form a sharp or sudden reduction in the cross-sectional area of the fluid flow zone. The pressure reduction in the contacting zone should be at least 1.8 p. s. i.

The removal of carbon by liquid sulfuric acid in the process of this invention is unexpected and unusually effective. Although the carbon entrained in the gaseous product is extremely finely divided, the liquid sulfuric acid essentially completely eliminates the carbon from the gases and can be readily separated from the acid, such as by filters and other separatory apparatus. In contrast, merely contacting the gas with sulfuric acid in a tower or similar apparatus is unsatisfactory, apparently due to the difficulty in obtaining adequate wetting of the carbon by the acid. Likewise, sulfuric acid does not reduce the water content of gases in processes heretofore known to the very low levels necessary to prevent corrosion. In the present process, even water in concentrations of less than 10 p. p. m. can be essentially completely removed, apparently due to extreme subdivision of the acid droplets and the resultant intimate contacting of the acid-water phases.

The sulfuric acid should be at least 90% acid and preferably should have a concentration of between about 95–98 percent. Lower acid concentrations tend to be excessively corrosive and have relatively high vapor pressures. While higher concentrations can be used, even above 100%, the lower concentrations are more economic.

Reference is now made to the drawing in which is shown one embodiment of a gas scrubbing apparatus for carrying out the process of this invention. The figure is an elevational view, partly in section. A feed pipe 10, through which a chlorinated alkane gas to be treated is fed, is connected to a reduced diameter pipe 30, forming a gas-liquid contacting zone 32. The pipe 30, extends into one end of a gas-liquid separator 40 which has a volume sufficient to materially reduce the velocity of the fluid ejected through the pipe 30. A packed tower 60 is positioned at the opposite end of the gas separator 40 which is in turn connected by line 64 to a knockout drum at a point spaced from the bottom thereof. An overhead line 72 is provided at the top of the knockout drum for flow of the scrubbed gases to recovery equipment (not shown), such as fractionators, distillation columns, stabilizer columns and the like.

The feed pipe 10 is shown having a curved section 12 which permits securing a nozzle 14 thereto for injection of acid into the gas in the direction of the gas flow. The nozzle has a restricted opening 16 such that the acid is sprayed into the gas and is broken up immediately into small droplets.

The reduced pipe 30 is provided with a flange 34 which is secured to the lower end of the feed pipe 10 and provides a sharp reduction in cross section of the fluid flow, the reduction in area being effected with essentially no taper i. e. the rate of change of cross sectional area to linear flow being essentially infinite. The reduced pipe 30 is also provided with a collar 36 for securing and sealing the pipe to the gas-liquid separator 40. A lining 38 is employed in the pipe 30 constructed of corrosion-resistant material, such as nickel alloys, to minimize deterioration due to the corrosive gas-liquid fluid and due to wear caused by high velocities through the contacting zone 32.

The gas-liquid separator 40 is provided with a series of angularly positioned baffles 42 disposed between the exit end of the reduced pipe 30 and the packed tower 60. These baffles prevent entrainment of large quantities of liquid with the gas and tend to smooth out the flow of gas to the packed tower 60. The gas-liquid separator is also provided with a drain, controlled by a valve 44, through which the used acid can be discarded from the system or from which a quantity of the used acid 46 can be recycled to the nozzle 14 for reuse in the process.

The packed tower 60 is a vertical column having a packing 62 to provide a surface upon which acid mist or droplets can collect and return to the separator 40. A wide selection of packing material is suitable. Typical examples of suitable packing are metals, such as steel or other metal wool, glass, e. g. in the form of beads or fiber, ceramics, e. g. Raschig rings, silica gel, sand, gravel or the like. The tower 40 is also provided with a feed line 48 near its top through which acid, e. g. used acid 46, or other media can be sprayed to additionally scrub the gases.

The knockout drum 70 is a vertical tank which is connected to the tower 60 by the line 64. The drum has a lower open section 74 in which liquid acid collects, and an upper packed section 76 for removing any remaining acid mist from the gases. A drain line 78 is provided at the bottom of the drum to remove acid which collects in the lower section 76. The packing for the upper section can be of any of the materials useful in the tower 62, discussed above.

In operation, a gas to be treated flowing in feed pipe 12 is mixed with liquid acid which is sprayed into the pipe 12 through nozzle 14. The gas velocity in the pipe approaching the reduced pipe 30 is generally at least 10 feet/second and preferably is above 30 feet/second. The acid is normally subjected to a sufficient pressure reduction over the nozzle 14 to effect dispersion or atomization of the liquid stream i. e. at least 5 p. s. i. and preferably above 40 p. s. i. The velocity of the acid upon ejection should be about equivalent to the gas velocity, unless appreciable excess gas pressure is available.

The pressure reduction of the fluid mixture through the contacting zone 32 should be, as noted above, at least 1.8 p. s. i. and preferably is at least 3 p. s. i. Normally, no greater pressure reduction than 20 p. s. i. is necessary or desired. The pressure reduction depends upon the suddenness of the pressure reduction, the length of the contacting zone, the velocity of the fluid flow and the ratio of the volume of gas to liquid. As noted above, a sudden change in the fluid flow path is desired, creating essentially a shock on the fluid mixture. The length of the contacting zone should be sufficient to provide a pressure reduction essentially equivalent to the pressure reduction due to the change in fluid flow path, i. e. at least a length equivalent to two diameters of the contacting zone and preferably greater than about 4 diameters. The volume of acid can be as low as about 2 gallons/1000 cubic feet (actual) of gas but preferably should be above about 100 gallons/1000 cubic feet of gas.

The intimate gas-liquid mixture is dispelled into the gas-liquid separator wherein the large bulk of liquid is separated from the gas and settles to the bottom of the separator, where it can be withdrawn through the valve 44. The gas then passes through the packing 62 in the tower 60, the major quantity of entrained liquid condensing or otherwise collecting on the packing surface and returning by gravity to the separator 40. In some instances, additional acid or other liquid is injected into the tower through the line 48 to scrub the gas. The gas stream then passes through the line 64 into the knockout drum 70 wherein any remaining acid vapor or mist is separated from the gas and settles to the bottom of the drum where it can be withdrawn through the drain 78 and returned, if desired, to the process. The overhead from the drum is removed through line 72 and processed or used in any desired manner.

The present invention is useful in the treatment of any chlorinated alkane hydrocarbons which contain entrained carbon fines and/or water and is particularly useful with gas mixtures which are produced by thermal chlorination. Generally, chlorinated alkanes having up to about 20 carbon atoms and having one or more chlorine atoms can be successfully treated by the process of this invention. Specific examples are methyl chloride, methylene chloride, chloroform, carbon tetrachloride, ethyl chloride, 1,1-dichloroethane, 1,2-dichloroethane, the trichloroethanes, the tetrachloroethanes, pentachloroethane, propyl chloride, propylene dichloride, the trichloropropanes, the tetrachloropropanes, the butyl chlorides, the hexyl chlorides, octyl chlorides, tetradecyl chlorides, and mixtures of the above. Other hydrocarbon chlorides can also be treated with sulfuric acid, in accordance with this invention, which compounds tend to pyrolyze at elevated temperatures or contain carbon and/or are contaminated by water.

In a specific example of this invention covering several days operation, a chlorinated alkane feed gas having varying quantities of both carbon and water is passed into conduit 10 and is therein mixed with sulfuric acid, entering through nozzle 12. The gaseous mixture contains Component:
    Ethane_____ 53 mole percent.
    Hydrogen chloride ____ 24 mole percent.
    Ethyl chloride_____ 20 mole percent.
    Ethylene dichlorides
      and others_____ 3 mole percent.
    Water_____ 0.265–0.565 mole percent.
    Carbon_____ 0.007–0.316 grain/s. c. f.

Sulfuric acid (96%) is fed at a rate of 57,500 parts/hour. Concentrations of from 91 to 98 percent give similar results. The gas is fed at a rate of 20,061 parts per hour. A weight ratio of acid to total gas of 2, 3 and 5 gives similar results. The water content of the gas after scrubbing is reduced to between 0.001–0.004 mole percent water, depending upon its initial water content. The highest value is obtained when employing a feed gas having the highest water content. The lower value is, for all practical purposes, a zero water value since the limit of accuracy of the analytical test is 0.002 mole percent. The scrubbed gas mixture in all cases contained no solid entrained carbon.

The ethyl chloride gaseous product above was produced in a thermal chlorination process, conducted in a fluidized bed reactor. Sand was employed as the fluidizing media. The temperature of the reactor was 760° F. and the pressure was 90 p. s. i. g. A chlorine to ethane feed mole ratio of 0.3 was employed. Other ratios give similar results with the present process, e. g. 0.2 and 0.6. The gas had a superficial linear velocity through the reactor of 1.6 F. P. S. The sand bed had been used for 41 hours at the beginning of the test. The carbon formation is maximum in the first few hours of use and thus the above conditions illustrate essentially steady-state conditions. However, the acid scrubbing technique and conditions discussed above will readily remove all the carbon fines, even during startup with a fresh catalyst bed.

The above example illustrates the acid scrubbing technique of this invention with chlorination of ethane to produce ethyl chloride. The products of more complete chlorination of ethane, i. e. the dichloroethanes and trichloroethanes, can be likewise treated to remove entrained carbon and water. In general, more pyrolysis is experienced with such processes due to high chlorine concentration and the resultant tendency of localized overheating. Similarly, chloromethanes, chloropropanes, and chlorobutanes can be treated as above with similar results. The higher alkanes pyrolyze even more readily than ethane and appreciably larger quantities of entrained carbon are noted even when they are impurities in a predominately ethane feed.

While the present process has been discussed primarily in connection with the reaction product of a process employing a fluidized bed, this invention finds utility in combination with other reactors or process conditions. In particular, the chlorination can be carried out in a pipe or tube reactor, preferably having baffles to provide back-mixing so that the heat of reaction will maintain reaction initiation. In fact, the present process has an added advantage in such processes since even greater quantities of carbon are formed using such techniques and the corrosion due to water content in the gases is at least equally serious. Also, the example relates to the manufacture of a monochlorinated product, i. e. ethyl chloride, in which a chlorine/alkane mole ratio of from about 0.2 to about between about 0.6 is desired. However, the formation of higher chlorinated alkane derivatives, with chlorine/alkane mole ratios of between about 0.6–6.0 or even higher, form even greater quantities of finely divided carbon and, thus, the present process has at least equal applicability and desirability to processes of this type.

In some cases it is desired to employ other scrubbing media, preferably also having drying characteristics, instead of or in addition to the concentrated sulfuric acid. When used, the media should have a relatively low volatility, have a viscosity similar to sulfuric acid and be inert to the chlorinated alkane.

We claim:

1. In a thermal alkane chlorination process in which the gaseous reaction product is contaminated with finely divided carbon and water, the improvement comprising intimately contacting said gaseous product with liquid concentrated sulfuric acid by simultaneously passing said gaseous product and sulfuric acid through a contacting zone having a restricted cross sectional area whereby the fluid is subjected to a pressure reduction of at least 1.8 p. s. i., and thereafter separating the gaseous product from the sulphuric acid containing the carbon and water.

2. The process of claim 1 wherein said gaseous product is mixed with said acid prior to being subjected to said pressure reduction.

3. The process of claim 2 in which the fluid flow path of said gas and said sulfuric acid mixture is essentially instantly reduced.

References Cited in the file of this patent

UNITED STATES PATENTS

| | | |
|---|---|---|
| 2,014,044 | Haswell | Sept. 10, 1935 |
| 2,183,046 | Reilly | Dec. 12, 1939 |
| 2,421,441 | Thronson et al. | June 3, 1947 |